(12) United States Patent
Blume et al.

(10) Patent No.: US 7,672,833 B2
(45) Date of Patent: Mar. 2, 2010

(54) METHOD AND APPARATUS FOR AUTOMATIC ENTITY DISAMBIGUATION

(75) Inventors: Matthias Blume, San Diego, CA (US); Richard Calmbach, San Diego, CA (US); Dayne Freitag, La Mesa, CA (US); Richard Rohwer, San Diego, CA (US); Scott Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1058 days.

(21) Appl. No.: 11/234,692

(22) Filed: Sep. 22, 2005

(65) Prior Publication Data

US 2007/0067285 A1  Mar. 22, 2007

(51) Int. Cl.
*G06F 17/21* (2006.01)
(52) U.S. Cl. ........................................................ 704/10
(58) Field of Classification Search .................... 704/4, 704/8, 9, 10
See application file for complete search history.

(56) References Cited

U.S. PATENT DOCUMENTS

| 7,065,483 | B2 * | 6/2006 | Decary et al. ................... 704/7 |
| 2002/0091688 | A1 | 7/2002 | DeCary et al. |
| 2005/0049852 | A1 * | 3/2005 | Chao ............................. 704/9 |
| 2007/0016580 | A1 * | 1/2007 | Mann et al. ..................... 707/6 |
| 2007/0208709 | A1 * | 9/2007 | Annand et al. .................. 707/3 |

OTHER PUBLICATIONS

Cucerzan, S. and D. Yarowsky, 1999. Language independent named entity recognition combining morphological and contextual evidence. In Proc. 1999 Joint SIGDAT Conference on EMNLP and VLC.*
Volk, M. and Clematide, S. 2001. Learn—Filter—Apply—Forget. Mixed Approaches to Named Entity Recognition. In Proceedings of the 6th international Workshop on Applications of Natural Language To information Systems (Jun. 28-29, 2001). A. M. Moreno and R. P. Riet, Eds. LNI, vol. 3. GI, 153-163.*
Grishman. "Natural Language Processing." 2003, http://cs.nyu.edu/courses/spring03/G22.2590-001/Lecture13.html.*

(Continued)

*Primary Examiner*—David R Hudspeth
*Assistant Examiner*—Jakieda R Jackson
(74) *Attorney, Agent, or Firm*—Mintz, Levin, Cohn, Ferris, Glovsky and Popeo, P.C.

(57) ABSTRACT

Entity disambiguation resolves which names, words, or phrases in text correspond to distinct persons, organizations, locations, or other entities in the context of an entire corpus. The invention is based largely on language-independent algorithms. Thus, it is applicable not only to unstructured text from arbitrary human languages, but also to semi-structured data, such as citation databases and the disambiguation of named entities mentioned in wire transfer transaction records for the purpose of detecting money-laundering activity. The system uses multiple types of context as evidence for determining whether two mentions correspond to the same entity and it automatically learns the weight of evidence of each context item via corpus statistics. The invention uses multiple search keys to efficiently find pairs of mentions that correspond to the same entity, while skipping billions of unnecessary comparisons, yielding a system with very high throughput that can be applied to truly massive data.

35 Claims, 4 Drawing Sheets

OTHER PUBLICATIONS

Collier, N. and Takeuchi, K. 2004. Comparison of character-level and part of speech features for name recognition in biomedical texts. J. of Biomedical Informatics 37, 6 (Dec. 2004), 423-435.*

Bagga, A. et al., Entity-Based Cross-Document Conferencing Using the Vector Space Model. In 17$^{th}$ International Conference on Computational Linguistics. Aug. 1998, whole document.

Cucerzan, S. et al., Language Independent Named Entity Recognition Combining Morphological and Contextual Evidence. In Proceedings 1999 Joint SIGDAT Conference on EMNLP and VLC, whole document.

Volk, M. et al. Learn—Filter—Apply—Forget. Mixed Approaches to Named Entity Recognition. In Proceedings of the 6$^{th}$ International Workshop on Applications of Natural Language to Information Systems. Jun. 2001. A.M. Moreno and R. P. Reit, Eds. LNI, vol. 3. GI, pp. 153-163.

Grishman. Natural Language Processing. 2003. http://cs.nyu.edu/courses/spring03/G22.2590-001/Lecture13.html, whole document.

Gooi, C.H. et al. Cross-document Coreference on a Large Scale Corpus. Proceedings of the Human Language Technology Conference / North American Chapter of the Association for Computational Linguistics Annual Meeting (HLT/NAACL). May 2004, whole document.

Collier, N. et al. Comparison of Character-level and Part of Speech Features for Name Recognition in Biomedical Texts. J. of Biomedical Informatics 37, Dec. 2004, pp. 423-435.

Annotation Guidelines for Entity Detection and Tracking. version. 4.2.6, Feb. 2004.

Bagga, A., et al. Entity-Based Cross Document Coreferencing Using the Vector Space Model, 1998.

Gooi, C. H., et al. Cross-Document Coreference on a Large Scale Corpus, 2004.

Huang, F., et al. Automatic Extraction of Named Entity Translingual Equivalence Based on Multi-Feature Cost Minimization, 2003.

Kalashnikov, D., et al. A Probablistic Model for Entity Disambiguation Using Relationships. TR-RESCUE-04-12. Jun. 1, 2004.

Mann, G, et al. Unsupervised Personal Name Disambiguation, 2003.

Mihalcea, R. The Role of Non-Ambiguous Words in Natural Language Disambiguation, 2003.

Ravin, Y., et al. Is Hillary Rodham Clinton the President? Disambiguating Names Across Documents, 1999.

* cited by examiner

METHOD AND APPARATUS FOR AUTOMATIC ENTITY DISAMBIGUATION

BACKGROUND OF THE INVENTION

1. Technical Field

The invention relates to the analysis of information. More particularly, the invention relates to a method and apparatus for automatic entity disambiguation.

2. Description of the Prior Art

Spoken and written text consists of characters, words, names, sentences, documents, conversations, and so on, but the world that the text describes consists of distinct objects and events. People now have access to an enormous amount of text, but are generally ultimately interested in actual persons and organizations that interact in the real world. Entity disambiguation, sometimes also referred to as entity tracking, is the process of determining which names, words, or phrases in text correspond to distinct persons, organizations, locations, or other entities. This determination is absolutely essential for reasoning, inference, and the examination of social network structures based on information derived from text.

We use the term entity to mean an object or set of objects in the world. A mention is a reference to an entity, such as a word or phrase in a document. Entities may be referenced by their name, indicated by a common noun or noun phrase, or represented by a pronoun. Mentions may aggregate with other mentions that refer to the same specific real-world object, and, taken together, mentions that refer to the same specific real-world object, and, taken together, the aggregated mentions model an entity. These corpus-wide aggregated models of entities are of primary importance, while the individual mentions of an entity are still of secondary importance (see Mitchell, A.; Strassel, S.; Przybocki, P.; Davis, J. K.; Doddington, G.; Grishman, R.; Meyers, A.; Brunstein, A.; Ferro, L. and Sundheim, B. 2004. *Annotation Guidelines for Entity Detection and Tracking (EDT), Version 4.2.6.* http://www.ldc.upenn.edu/Projects/ACE/).

Entity disambiguation inherently involves resolving many-to-many relationships. Multiple distinct strings, such as "Abdul Khan," "Dr. Khan," and "'Abd al-Qadir Khan," may refer to the same entity. Simultaneously, multiple identical mentions refer to distinct entities. For example, literally tens of thousands of men share the name "Abdul Khan."

Consider the following sentences from a corpus of news text:

"Young pacer Yasir Arafat chipped in with two late wickets to finish with two for 36 in 18 overs."

"General Musharraf also apprised Yasir Arafat of the outcome of his negotiations with the Indian Prime Minister Atal Behari Vajpayee at Agra."

"Palestinians demonstrated in Gaza City Sunday in support of Palestinian leader Yasser Arafat."

"Makkah has announced that the Arafat Gathering (9 Zul-Hajj) will be on Sat 31 Jan. 2004."

These can be confusing even to a human reader. The first underlined name refers to a Pakistani cricket player, the next two refer to the late Palestinian leader, and the last refers to a place near Mecca, Saudi Arabia. The job of the entity disambiguation system is to automatically assign these four mentions to three distinct entities, correctly grouping only the second mention of "Yasir Arafat" with "Yasser Arafat".

It would be advantageous to provide an entity disambiguation technique that correctly resolves the above mentions in the context of the entire corpus.

SUMMARY OF THE INVENTION

The invention provides a method and apparatus for entity disambiguation that correctly resolves the above mentions in the context of an entire corpus. The invention is based largely on language-independent algorithms. Thus, it is applicable not only to unstructured text from arbitrary human languages, but also to semi-structured data, such as citation databases and the disambiguation of named entities mentioned in wire transfer transaction records for the purpose of detecting money-laundering activity. The system uses multiple types of context as evidence for determining whether two mentions correspond to the same entity and it automatically learns the weight of evidence of each context item via corpus statistics. The invention uses multiple search keys to efficiently find pairs of mentions that correspond to the same entity, while skipping billions of unnecessary comparisons, yielding a system with very high throughput that can be applied to truly massive data.

DETAILED DESCRIPTION OF THE INVENTION

Entity disambiguation automatically determines which records refer to the same entity. A record may be, for example, a plain text news article, possibly resulting from automatic translation or transcription, a wire transfer transaction record, or a credit application. An entity is an identifiable and persistent item such as a person, organization, location, telephone number, piece of equipment, etc. Note that two records referring to "Bill Smith" may actually be referring to two different persons, yet two records referring to "Bill Smith and William Andrew Smith" may be referring to the same person. The invention herein disclosed-has numerous applications, including use in money laundering detection, application fraud detection, and text processing.

Uniquely, the invention provides a method and apparatus that:

Recognizes when identical names correspond to distinct entities;
Recognizes when different names, including spelling and transliteration variations correspond to a single entity;
Provides high disambiguation performance; and
Provides high computational throughput.

The presently preferred embodiment of the invention employs such techniques, which are discussed in greater detail below, as:

Approximate string matching techniques.
Using arbitrary sources of context as evidence.
Automatically learning the weight of evidence from the data.
Automatically learning a distance measure from the data.
Efficient search and merge to deal with billions of possibly corresponding mentions.

Entity disambiguation resolves the many-to-many correspondence between mentions of entities in text and unique real-world entities. Entity disambiguation can bring to bear global (corpus-level) statistics to improve the performance of named entity recognition systems. More importantly, people (ranging from intelligence analysts to "surfers" of the World Wide Web) are keenly interested in relationships between real-world entities. Entity disambiguation makes possible additional types of relation assertions and affects relation extraction performance assessment. Finally, link analysis and inference inherently operate at the level of entities, not text strings. Thus, entity disambiguation is a prerequisite to carrying out these higher-level operations on information extracted from plain text. The invention disclosed herein is an automatic entity disambiguation capability.

Thus, the invention provides a method and apparatus for entity disambiguation that solves the problem of determining which names, words, or phrases in text correspond to distinct persons, organizations, locations, or other entities in the context of an entire corpus. The invention is based largely on language-independent algorithms. Thus, it is applicable not only to unstructured text from arbitrary human languages, but also to semi-structured data, such as citation databases and the disambiguation of named entities mentioned in wire transfer transaction records for the purpose of detecting money-laundering activity. The system uses multiple types of context as evidence for determining whether two mentions correspond to the same entity and it automatically learns the weight of evidence of each context item via corpus statistics. The invention uses multiple search keys to efficiently find pairs of mentions that correspond to the same entity, while skipping billions of unnecessary comparisons, yielding a system with very high throughput that can be applied to truly massive data.

Figure 1:
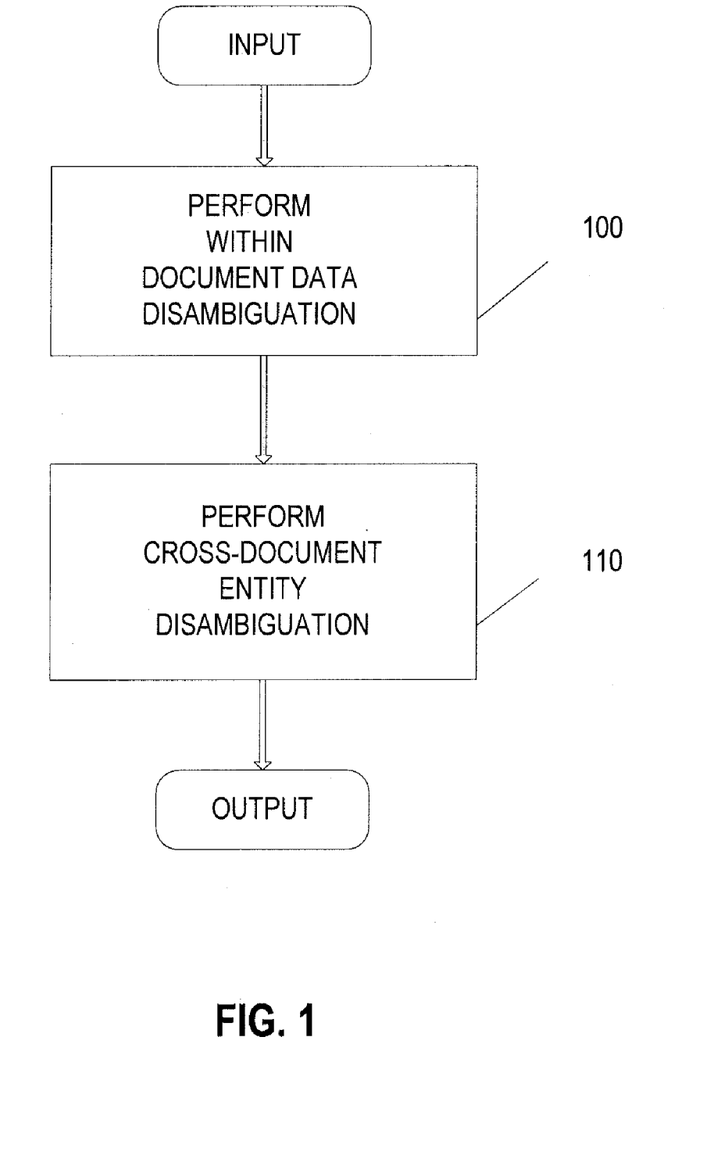
FIG. 1 is a block diagram showing automatic entity disambiguation according to the invention.

FIG. 1 is a block diagram showing automatic entity disambiguation according to the invention. In this embodiment, an input is provided to a mechanism for performing within-document entity disambiguation (100) and, thence, to a mechanism for performing cross-document entity disambiguation (110). These mechanisms are discussed in detail below. The invention does not require that both of these mechanisms be used for purposes of entity disambiguation, nor do they need to be used in any particular order.

Methodology

In unstructured text, each document provides a natural context for entity disambiguation. Within a document, two mentions of "Abdul Khan" probably do refer to the same person unless there is evidence to the contrary. Similarly, "NFC" and "National Fertilisers Corporation" probably refer to the same organization if they occur in the same document, barring other evidence. Thus, we first carry out within-document co-reference resolution, aggregating information about each entity mentioned in each document. We then use these entity attributes as features in determining which documents concern the same entity.

Within-Document Disambiguation

When dealing with unstructured text, a named entity recognition (NER) system provides the input to the entity disambiguation. The presently preferred embodiment of the invention uses multiple NER systems that utilize supervised learning, name list and rule-based post-processing, and engineered regular expressions. Each system provides mention start and stop boundaries, entity type assertions, and confidence values. The systems complement one another in that the statistical learning systems use local context and provide higher coverage, whereas the rule-based systems are more accurate, especially for numeric types, such as dates and monetary amounts.

Figure 2:
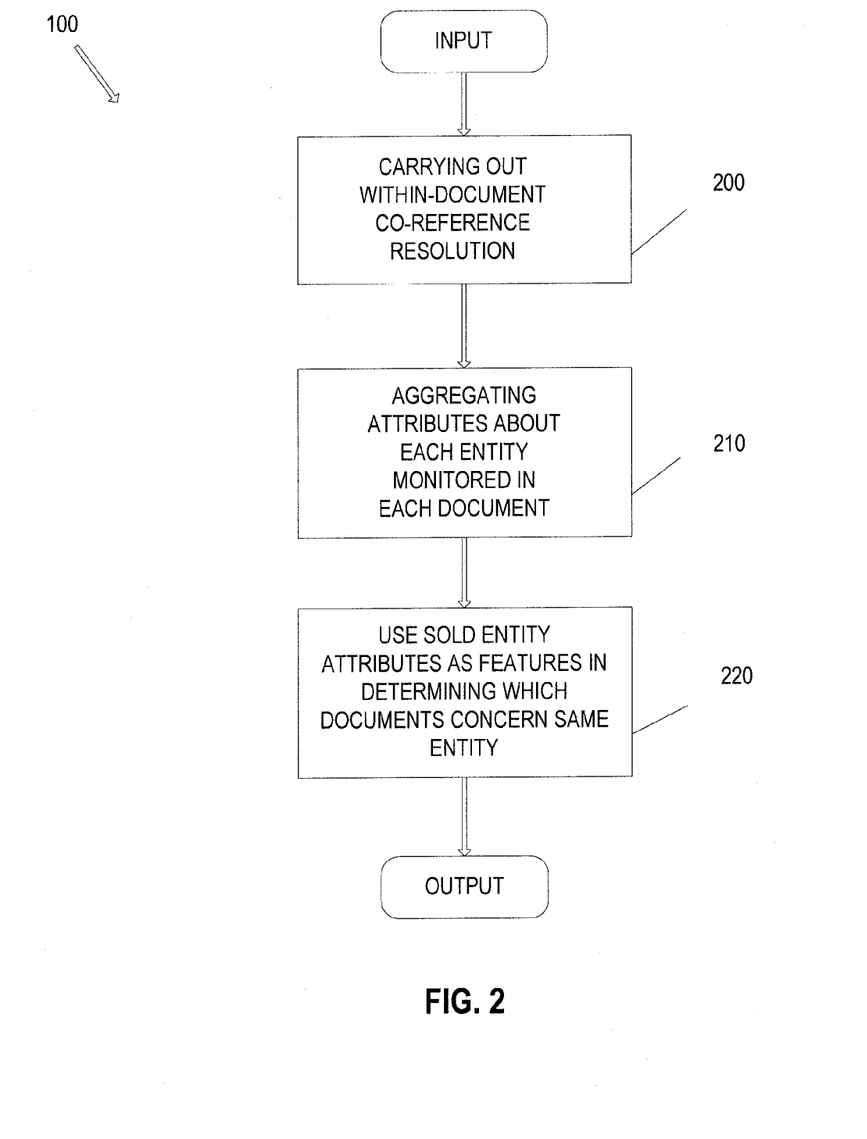
FIG. 2 is a block diagram showing within-document entity disambiguation according to the invention.

FIG. 2 is a block diagram showing within-document entity disambiguation according to the invention. Generally, in one embodiment of the invention an input is received and a within-document co-reference resolution is carried out (200). Attributes are aggregated about each entity mentioned in each document (210), and the entity attributes are used as features in determining which documents concern a same entity (220). Those skilled in the art will appreciate that many variations may be provided to this approach, all within the scope of the invention.

In this environment, the first step in entity disambiguation is determining which mentions to deal with. The multiple NER systems sometimes mark overlapping text segments as being named entities, and sometimes determine different entity types for the same mention. These are specific symptoms of a more general problem that would be present even if we used only a single NER system. In general, the performance of an NER system that uses only local context can be improved by using document-level (or corpus-level) information. For example, if the system determined that two mentions of "Christian Dior" refer to a company and one mention refers to a person, the performance could be improved by using a majority vote to re-categorize the person as a company. Similarly, a mention "Christian Dior Produced" could be identified as a segmentation error based on the information that "Christian Dior" was recognized as an entity elsewhere, and a mention "Christian Dior" that was not recognized by the NER could be labeled as a company based on the evidence from the rest of this document.

The algorithm herein disclosed resolves entity type discrepancies via majority vote over all identical strings that have been labeled, using name lists (person titles, given names, and family names, as well as location tokens) and confidence values to resolve ties. It uses confidence values to resolve segmentation discrepancies, using string starting and ending positions to resolve ties. It then detects and repairs some NER segmentation errors, such as "Christian Dior Produced," using document-level token sequence counts and word lists. Finally, it identifies additional mentions that were not recognized by the NER engine that are identical to recognized mentions, and labels those as entities. Only at this point have all entity mentions been identified, even though some disambiguation, i.e. inferring that "Christian Dior Produced" and "Christian Dior" refer to the same entity, has already been carried out.

The system next carries out entity type-specific parsing to extract entity attributes, generate standardized names, e.g. p_abdul_khan_p for "Dr. Abdul Q. Khan,", and populate the data structures that are used to perform the within-document entity disambiguation.

For example, in the case of person mentions the entity information extraction process detects prefixes (titles) and suffixes ("Jr.", "III", "Esq."), which are removed from the named itself and stored as attributes. The system uses a set of regular expressions to operate on token type sequences, as opposed to on the names themselves, and resolve ambiguities, such as the usage of "Dean" in "Assistant Dean Smith" (title), "Dean Michael Smith" (title), "Col. Dean Smith"(given name), and "Michael Dean" (family name). The list of given names includes gender probabilities and confidence levels. This is used in conjunction with the title to infer the likely gender of the entity. The titles also provide evidence for entity attributes including job category, e.g. military, academic, religious, government, etc.

In the case of organizations, the system computes and stores likely acronyms for subsequent use in the disambiguation process.

A list of entities is initialized as an empty list and the names are processed in order of longest to shortest within each entity type class. Each name is compared to all entities with which it may be compatible, based on the aforementioned data structures. The comparison is carried out via entity type-specific distance measures. For example, the person distance measure enforces gender consistency, deals with given name variants ("Mike" vs. "Michael") using a given name variant list, and allows initials to match long forms of names. If a match is found, this name is assigned to the existing entity. If not, it is used to seed a new entity. If a name matches multiple entities, it is assigned to the name having the most recent mention.

This within-document disambiguation process is not perfect, but it is close. Careful inspection indicates that less than one percent of the assignment operations are incorrect. The error rate in this process is lower than the named entity recognition error rate which underlies it. The presently preferred embodiment of the invention errs on the side of not merging entities, rather than incorrectly merging entities. Specifically, there is no mechanism for merging names with spelling errors. Within a single document, it is very difficult to determine whether two distinct individuals named "Abdul Kahn" and "Abdul Kahan" really exist, or whether a single instance of the latter string represents a spelling error. Looking at multiple documents provides additional statistics. Thus, the cross-document disambiguation process described below still merges some entities, including those resulting from spelling errors, even within individual documents.

Some aspects of the within-document disambiguation process are language-specific. However, most of these have been separated as separate components, e.g. name lists and type sequence regular expressions, in the software architecture and can consequently be easily replaced for different languages.

These language-specific components may be viewed as pattern generators. If it is possible to create one observed string from another, the two mentions are legitimate variants of the same name. Table 1 lists several name variations and whether the disclosed algorithm considers each pair as possible variants of the same name. A simple edit distance such as Levenshtein, or string normalization such as Soundex, could not produce the desired results. Automatically learning the desired transformation properties from a corpus of text, obviating the need for language-specific resources and rules, may be possible.

TABLE 1

Name pairs (columns 1 and 2) and the desired outcome (column 3), indicating whether they should be considered possible variants of the same name

| American Broadcasting Corporation | Australian Broadcasting Corporation | N |
| ABC | Australian Broadcasting Corporation | Y |
| Dr. Ho | Dr. Hu | N |
| Dr. Ho | Professor Benjamin Xuhui Ho | Y |
| A. Smith | Michael A. Smith | N |
| M. Smith | Michael A. Smith | Y |

Cross-Document Disambiguation

Within-document entity disambiguation appeared at first to be simple because of the small number of string pairs that need to be compared. Instead, it turned out to be complicated due to the numerous natural language conventions that humans intuitively use in generating and resolving these co-references. Cross-document disambiguation, in contrast, at first appeared difficult because of the large number of document-level entity pairs that need to be compared. In actuality, the facts that humans generally do not use linguistic constructs to generate cross-document co-references, and that computers are good at carrying out millions of comparisons, facilitate graceful and general (language-independent) automatic solutions.

The herein disclosed cross-document entity disambiguation relies on a key insight: an entity can be distinguished by the company it keeps. If Abdul Khan 1 associates with different people and organizations at different locations than Abdul Khan 2, then he is probably a different person. Furthermore, if it is possible to compare two entities based on one type of context, it is possible to compare them based on every type of context. Using additional context domains improves the entity disambiguation performance.

Figure 3:
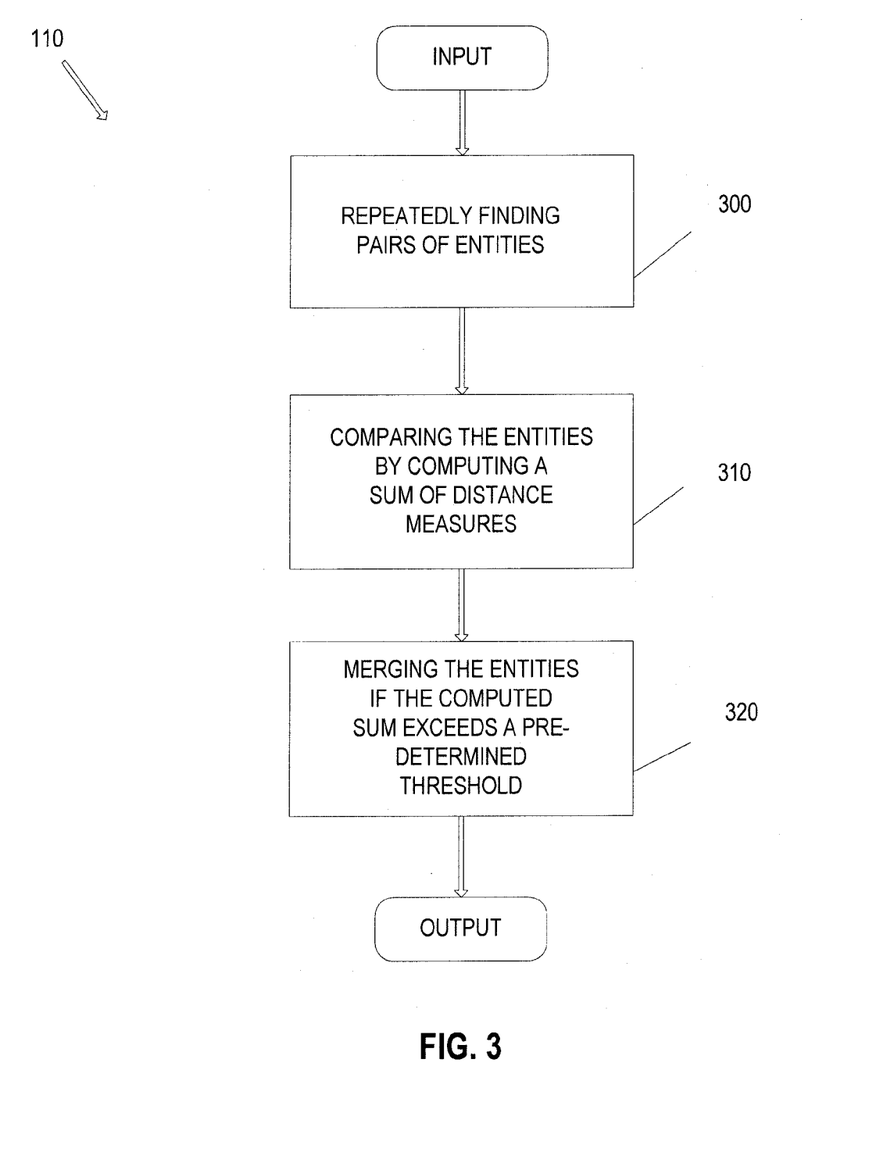
FIG. 3 is a block diagram showing cross-document entity disambiguation according to the invention.
Figure 4:
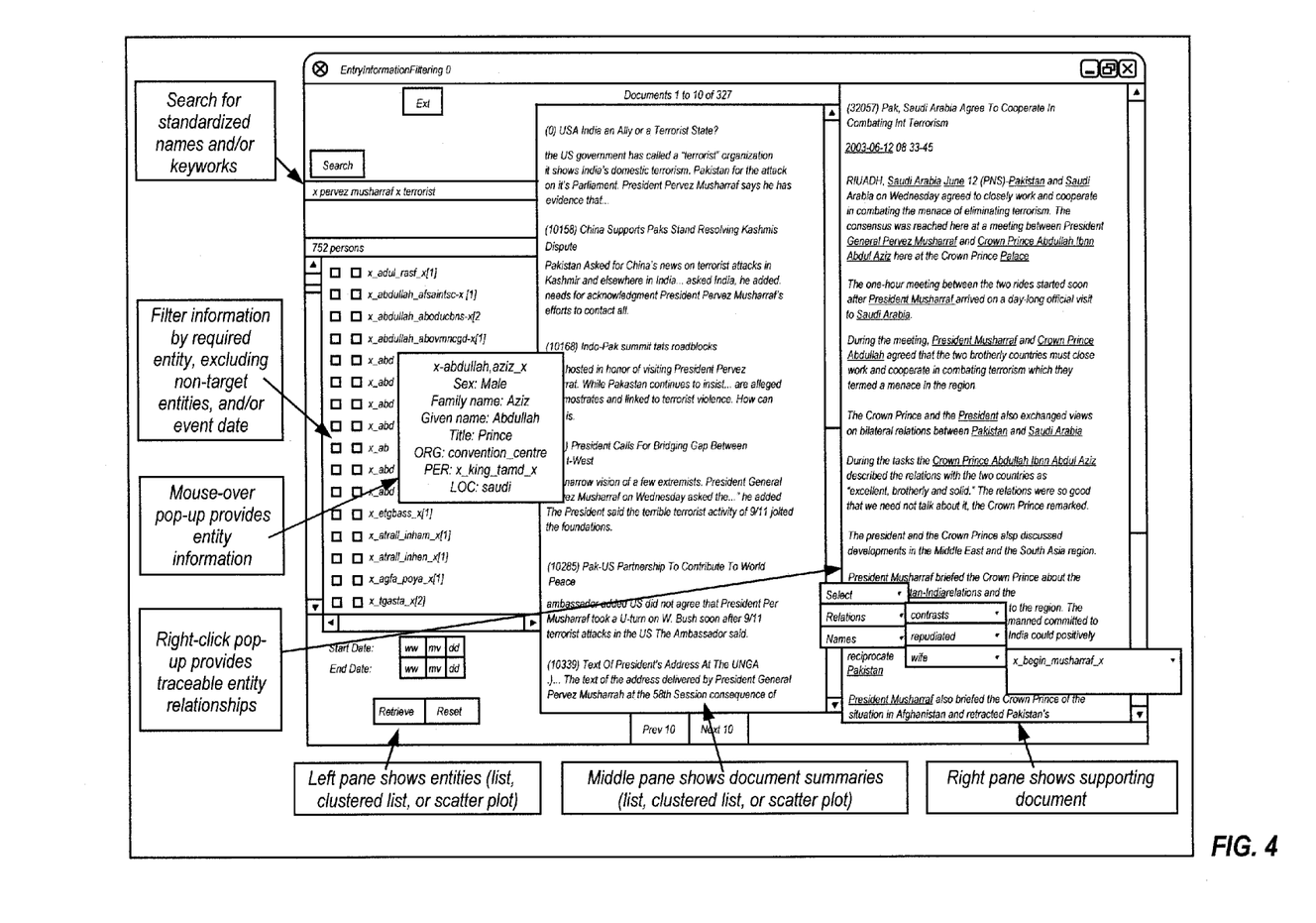
FIG. 4 is a screen shot of a-demonstration system user interface according to the invention.

FIG. 3 is a block diagram showing cross-document entity disambiguation according to the invention. Generally, in one preferred embodiment, an input is provided and a mechanism within the invention repeatedly finds pairs of entities (300). The entities are compared by computing a sum of distance measures (310) and the entities are then merged if the computed sum exceeds a predetermined threshold (320). Those skilled in the art will appreciate that other approaches may be provided, all within the scope of the invention.

Within each domain, we require a finite set of context items. In the location, organization, and person domains, these are the standardized names derived in the entity information extraction phase of within-document disambiguation. We use the logarithm of the inverse name frequency, i.e. the number of standard names with which this context item appears, INF, as a weight indicating the salience of each context item. Co-occurrence with a common name provides less indication that two mentions correspond to the same entity than co-occurrence with an uncommon name. A sparse count vector is adequate for recording all of the items that co-occur with a particular entity.

We similarly create a sparse count vector of title tokens that occur with the entity and compute INF weights for the title tokens.

Finally, we create a word vector space in a completely unsupervised fashion (see Caid, W. and Oing, P. 1997. System and Method of Context Vector Generation and Retrieval. U.S. Pat. No. 5,619,709). Each document may be represented by a vector in the space. To avoid double-counting context features, we delete all named entity mentions from each document prior to computing its vector. An unsupervised clustering of some of the document vectors defines a segmentation of the space, and each document can then be uniquely assigned to a single segment. We again compute INF weights indicating the context's salience, this time based on the number of standardized names that occur in documents falling into each segment. Those skilled in the art will appreciate that any method for assigning each document to one or more segments can be used in place of unsupervised segmentation of a context vector space, all within the scope of the invention.

We define a separate distance measure per context domain. It would be possible to use a single distance measure, such as Hellinger distance or dot product of the INF-weighted count vectors. However, the probabilities of occurring with multiple items within a single domain are conditional and not independent. The probability of two names both occurring with "Rawalpindi," "Rawalpindi, Pakistan," and "Islamabad" is not immensely different from the probability of occurring with only the least common of these three. We are able to discount the co-occurrence with multiple items, as well as quantify an unexpected lack of shared co-occurrence, by engineering each distance measure for each specific domain. The score produced by each distance measure may be loosely interpreted as the log of the likelihood of two randomly generated contexts sharing the observed degree of similarity. Alternatively, it is possible to automatically learn the distance measures from unlabeled data by utilizing the fact that pairs of unexpectedly common full names typically correspond to the same person whereas pairs with the same family name but differing given names typically correspond to different individuals.

In addition to the context-based distance measures, we use a lexical (string) distance measure. This is based on exactly the same transformations (and source code) as used to compare strings for intra-document entity disambiguation plus the Soundex algorithm to measure whether two name tokens sound the same. A large negative score indicates a great deal of similarity, i.e. log likelihood.

The process of cross-document entity disambiguation now boils down to repeatedly finding a pair of entities, comparing them, i.e. computing the sum of the above distance measures, and merging them if the score exceeds some threshold. Given N document-level entities in a corpus, comparing all pairs of entities would require $O(N^3)$ time because each merge operation creates a new entity. Because N is typically 100,000 or more, this is prohibitively expensive. Thus, we compute sets of keys based on lexical similarity and compare only entities that are likely to match.

Key characteristics of this cross-document entity disambiguation algorithm, especially relative to other such methods (see Bagga, A. and Baldwin, B. 1998. Entity-based Cross-document Coreferencing Using the Vector Space Model. 17th International Conference on Computational Linguistics (CoLing-ACL). Montreal, Canada. 10-14 Aug. 1998, 79-85; Gooi, C. H. and Allan, J. 2004. Cross-Document Coreference on a Large Scale Corpus. Human Language Technology Conference (HLT-NAACL). Boston, Mass. 2-7 May, 2004, 9-16; Huang, F.; Vogel, S. and Waibel, A. 2003. Automatic Extraction of Named Entity Translingual Equivalence Based on Multi-feature Cost Minimization. ACL-03 Workshop on Multilingual and Mixed-language Named Entity Recognition. Sapporo, Japan. 12 Jul. 2003, 9-16; Kalashnikov, D. V. and Mehrotra, S. 2005. A Probabilistic Model for Entity Disambiguation Using Relationships. SIAM International Conference on Data Mining (SDM). Newport Beach, Calif. 21-23 Apr. 2005; Mann, G. S. and Yarowsky, D. 2003. Unsupervised Personal Name Disambiguation. Conference on Computational Natural Language Learning (CoNLL). Edmonton, Canada. 31 May-1 Jun. 2003, 33-40; Mihalcea, R. 2003. The Role of Non-Ambiguous Words in Natural Language Disambiguation. Conference on Recent Advances in Natural Language Processing (RANLP). Borovetz, Bulgaria. 10-12 Sep. 2003; and Ravin, Y. and Kazi, Z. 1999. Is Hillary Rodham Clinton the President? Disambiguating Names across Documents. ACL 1999 Workshop on Coreference and Its Applications. College Park, Md. 22 Jun. 1999, 9-16) are:

Recognizes when identical names correspond to distinct entities.

Recognizes when different names, including spelling and transliteration variations, correspond to a single entity.

Uses many different sources of context as evidence.

High disambiguation performance.

High computational throughput.

Performance

The inventors have tested the disclosed entity disambiguation system on several semi-structured and unstructured text data sets. Here, we report the performance on a set of 48,566 recent Pakistan News Service documents. This English-language newspaper focuses on the Middle East and, consequently, includes numerous transliterated entity names. Furthermore, numerous articles were written by amateurs and persons who speak English as a second language. Thus, there is substantial variation in capitalization, punctuation, grammar, and spelling: characteristics that make NER challenging.

The named entity recognition process identified a total of 900,000 location, organization, and person mentions as shown in Table 2.

TABLE 2

Number of mentions by entity type in the data set

| Entity Type | Number of Mentions |
|---|---|
| LOCATION | 393,799 |
| ORGANIZATION | 248,943 |
| PERSON | 252,423 |

Within-document entity disambiguation reduced the number of items of concern to approximately 530,000, as shown in Table 3. As mentioned earlier, the accuracy of these merge operations exceeds 99%. This level of performance is possible because the task is not difficult, i.e. it is much easier than pronoun co-reference resolution for example, and because some potential merge operations were not carried out at this stage because they can be handled more accurately, due to more extensive statistics available, in the cross-document disambiguation process.

TABLE 3

Number of document-level entities, after within-document entity disambiguation, by entity type

| Entity Type | Document-level Entities |
|---|---|
| LOCATION | 209,872 |
| ORGANIZATION | 180,095 |
| PERSON | 145,064 |

Cross-document entity disambiguation reduced the number of distinct persons to 55,477 with 36,204 distinct standardized names. Cross-document entity disambiguation may also be implemented for locations and organizations.

Thus, 89,587 merge operations were performed in this step. Inspection of a representative sample of the entities shows that almost all of the merge operations (>95%) were correct. The system performs better when there is a lot of information than when confronted by a paucity of information. For example, the entity p_pervez_musharraf_001_p occurs in 8,187 documents. That is a lot of context for one entity! Furthermore, "Pervez" and "Musharraf" are fairly distinctive and uncommon names. All 8,186 merge operations for this entity seem to be correct. The system found over 40 spelling variations of this name, some of which are listed in Table 4.

TABLE 4

Some variations on the name "Pervez Musharraf" found in the data set

| | |
|---|---|
| Gneral Pervez Musharraf | Pervaiz Musharaf |
| Musharraf | Pervez Musharraf Firday |
| Parvaiz Musharraf | Pervez Musharrafs |

TABLE 4-continued

Some variations on the name "Pervez
Musharraf" found in the data set

| Parvez Musharaf | Pervez Mushharraf |
| Perevz Musharraf | Prvez Musharraf |

Similarly, thorough manual inspection reveals that the system correctly assigned each of 245 document-level mentions of variants of "Yasser Arafat" (listed in Table 5) to the correct of two entities mentioned in the introduction, i.e. the cricket player and the Palestinian leader.

TABLE 5

Variations on the name "Yasser Arafat" found in the
data set, and unique entity to which mentions were assigned

| p_yasir_arafat_001_p | p_yasser_arafat_001_p |
| --- | --- |
| Arafat | Arafat |
| PNS Yasir Arafat | Yasar Arafat |
| Yasar Arafat | Yasir Arafat |
| Yasir Arafat | Yasser Arafat |
| Yasir Arfat | Yasser Arfat |

Disambiguation of entities that occur in few documents is more difficult, especially for common names such as "Abdul Khan." In fact, the system found 81 distinct persons, occurring in 153 documents, named "Abdul Khan."

Several techniques were used to arrive at the above accuracy figures. The cross-document entity disambiguation software accepts ground truth information and logs all merge operations involving the labeled mentions, enabling automated accuracy and coverage measurement. We separately checked the accuracy on frequent, moderately frequent, and rare entities, as determined by the system, and combined the results for the overall (>95%) estimate. Name statistics sometimes obviated the need for exhaustively examining documents. For example, we found only four persons named "Musharraf" in the data set: Begum Sehba Musharraf, Javed Musharraf, Pervez Musharraf, and Zarin Musharraf-ud-Din. We assume that all mentions, including obvious spelling variations, of "Pervez Musharraf" refer to the same person. The graphical user interface described below was extremely helpful in this exploration.

The number of potential merge operations that the system did not carry out for pairs of entities with identical standard names is 19,273. Some (most) of these operations were correctly not carried out. Furthermore, some entities with differing standard names should have been merged. Nonetheless, this approximates an upper limit on the number of missed merge operations. Referring back to the aforementioned 89,587 merge operations that were performed, it appears that the system carried out well in excess of 80% (perhaps more like 90%) of the merge operations of two document-level entities that correspond to a single unique person in the real world.

We are aware of only one reference data set for benchmarking cross-document entity disambiguation results, the John Smith corpus (see Bagga, A. and Baldwin, B. 1998. Entity-based Cross-document Coreferencing Using the Vector Space Model. 17th International Conference on Computational Linguistics (CoLing-ACL). Montreal, Canada. 10-14 Aug. 1998, 79-85), but were not able to obtain access to it in time to include results here. The John Smith corpus allows evaluation of only a subset of the cross-document entity disambiguation functionality. Documents with typing errors, transliteration variations, and mentioning "Smith" without a given name are not included. A more extensive reference corpus for cross-document entity disambiguation would help assess the state of the art.

The current prototype disambiguation system's Perl implementation is not optimized for speed. Nonetheless, single-threaded cross-document disambiguation for the entire PakNews corpus takes less than 30 minutes on a moderate Linux workstation, i.e. less than the time consumed by our NER. Implementation in C typically results in a factor of ten speed-up. Combined with additional hardware, it is possible to carry out cross-document entity disambiguation in reasonable time on very large corpora.

A demonstration system with a graphical user interface for browsing disambiguation of entities and their relations was produced by the inventors. As taught herein Error! Reference source not found., the system enables selection of documents that mention a particular entity (as opposed to name), clustered display of entities, and more.

The data structures used both in the disambiguation, as well as in the demonstration system facilitate incremental refinement, e.g. manual merging of entities or separation of entities that should not have been merged, by the user.

Benefits to NER and Subsequent Processing

Named Entity Recognition

Most NER systems use only locally-available information for determining entity boundaries and entity types. Information from outside the current sentence or document is ignored. Entity disambiguation makes it possible to use this information to refine the NER results.

For example, if the entity disambiguation system determines that two mentions, "Dean Smith" and "Michael Smith" (whose title is "Dean"), correspond to the same entity, it is possible to correct the NER output to recognize the first "Dean" as a title rather than a given name.

The invention explicitly carries out this process at the stage of within-document entity disambiguation and in some cases, e.g. Table 4, also implicitly achieves this effect via cross-document entity disambiguation.

Relation Extraction

It is possible to find relation strings in text and process them without understanding the underlying entities. For example, the phrase "Chris Smith and his son David" may be parsed as indicating a family relationship between a person named "Chris Smith" and a person named "David." However, it is difficult to obtain a confidence level for this relation, i.e. "David" might instead be the son of some other person in the example, based on a single relation mention.

Cross-document entity disambiguation makes it possible to define a new strength of relation assertion. A pair of entities that occurs together in many documents is related, period. This is one of several relation types that is exposed via the demonstration system. Similarly, if multiple documents mention the same relation between two entities, our confidence in this relation increases. This provides a mechanism for defining a relation confidence score.

Link Analysis

If "Chris" has a son named "David" and "David" has a son named "Evan," does that mean that "Chris" and "Evan" are related? Only if the two "Davids" are the same person!

Entity disambiguation trivially turns a set of relation assertions derived from plain text into a linkage graph. Without entity disambiguation, it is impossible to generate this linkage graph. Entity disambiguation is a necessary technology for enabling fully automated link analysis from plain text data.

Inference

Is the "Chashma Nuclear Power Plant" "located in" "Newark, N.J."? One might attempt to reason so based on assertions extracted from plain text without using entity disambiguation. "Chashma Nuclear Power Plant" "is a kind of" "plant" and "plant" "is located in" "Newark." The problem, of course, is that the last "plant" refers to a specific plant that is not the same as the "Chashma Nuclear Power Plant." Entity disambiguation would label the two plants as distinct entities and eliminate the problem.

In general, we do not reason with words. We reason with logic, and logic may be expressed in words. Similarly, inference does not operate on words. It operates on real-world concepts, objects, events, and so on. Entity disambiguation provides the model that links text mentions to actual entities and, thus, makes it possible to reason over real-world objects based on information extracted from text.

Technical Implementation

Exemplary Digital Data Processing Apparatus

Data processing entities such as a computer may be implemented in various forms. One example is a digital data processing apparatus, as exemplified by the hardware components and interconnections of a digital data processing apparatus.

As is known in the art, such apparatus includes a processor, such as a microprocessor, personal computer, workstation, controller, microcontroller, state machine, or other processing machine, coupled to a storage. In the present example, the storage includes a fast-access storage, as well as nonvolatile storage. The fast-access storage may comprise random access memory ("RAM"), and may be used to store the programming instructions executed by the processor. The nonvolatile storage may comprise, for example, battery backup RAM, EEPROM, flash PROM, one or more magnetic data storage disks such as a hard drive, a tape drive, or any other suitable storage device. The apparatus also includes an input/output, such as a line, bus, cable, electromagnetic link, or other means for the processor to exchange data with other hardware external to the apparatus.

Despite the specific foregoing description, ordinarily skilled artisans (having the benefit of this disclosure) will recognize that the invention discussed above may be implemented in a machine of different construction, without departing from the scope of the invention. As a specific example, one of the components may be eliminated; furthermore, the storage may be provided on-board the processor, or even provided externally to the apparatus.

Logic Circuitry

In contrast to the digital data processing apparatus discussed above, a different embodiment of this disclosure uses logic circuitry instead of computer-executed instructions to implement processing entities of the system. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Signal-Bearing Media

Wherever the functionality of any operational components of the disclosure is implemented using one or more machine-executed program sequences, these sequences may be embodied in various forms of signal-bearing media. Such a signal-bearing media may comprise, for example, the storage or another signal-bearing media, such as a magnetic data storage diskette, directly or indirectly accessible by a processor. Whether contained in the storage, diskette, or elsewhere, the instructions may be stored on a variety of machine-readable data storage media. Some examples include direct access storage, e.g. a conventional hard drive, redundant array of inexpensive disks ("RAID"), or another direct access storage device ("DASD"), serial-access storage such as magnetic or optical tape, electronic non-volatile memory, e.g. ROM, EPROM, flash PROM, or EEPROM, battery backup RAM, optical storage e.g. CD-ROM, WORM, DVD, digital optical tape, or other suitable media. In one embodiment, the machine-readable instructions may comprise software object code, compiled from a language such as assembly language, C, etc.

CONCLUSIONS

Information analysts are keenly interested in coalescing information about entities of interest across sizable collections of free-form text and in exploring relations between actual entities. This is very different from retrieving documents that contain a particular name (entity mention). Furthermore, the ability to determine which mentions refer to which real-world entities is absolutely essential for automatic link analysis and inference over information extracted from text.

This invention comprises an implementation of this capability. The disambiguation performance is high in the many-to-many scenario that includes spelling variations and multiple persons with the same name. An efficient search technique provides adequate throughput for applying the methodology to large real-world data sets.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for entity disambiguation for execution by one or more data processors, the method comprising:
    carrying out a within-document co-reference resolution for a plurality of documents, the within-document co-reference resolution comprising:
        initializing, by at least one of the data processors, a list of entities as an empty list;
        processing, by at least one of the data processors, names in order of longest to shortest within each entity type class; and
        comparing, by at least one of the data processors, each name to all entities with which it may be compatible, based on a token hash or database, the comparing being carried out via entity type-specific distance measures;
    aggregating, by at least one of the data processors, attributes about each entity mentioned in each document; and
    using, by at least one of the data processors, said entity attributes as features in determining which documents concern a same entity.

2. The method of claim 1, further comprising:
using one or more named entity recognition (NER) systems to provide input for entity disambiguation;
each NER providing mention start and stop boundaries, entity type assertions, and confidence values.

3. The method of claim 2, further comprising:
said NER systems using document-level or corpus-level information.

4. The method of claim 2, further comprising:
using, by at least one of the data processors, a majority vote to re-categorize entities.

5. The method of claim 2, further comprising:
changing, by at least one of the data processors, entity types based on evidence from the rest of a document upon identification of segmentation errors;
recognizing, by at least one of the data processors, additional mentions if identical strings were recognized as entities, elsewhere in said document.

6. The method of claim 1, further comprising:
resolving, by at least one of the data processors, entity type discrepancies via majority vote over all identical strings in a document that have been labeled, using name lists which comprise any of person titles, given names, family names, and location tokens, and confidence values to resolve ties.

7. The method of claim 1, further comprising:
resolving, by at least one of the data processors, segmentation discrepancies with confidence values by using string starting and ending positions to resolve ties.

8. The method of claim 7, further comprising:
detecting and repairing, by at least one of the data processors, at least some NER segmentation errors using document-level token sequence counts and word lists.

9. The method of claim 1, further comprising:
identifying, by at least one of the data processors, additional mentions that were not recognized by the within document co-reference resolution that are identical to recognized mentions; and labeling, by at least one of the data processors, said mentions as entities.

10. The method of claim 1, further comprising:
carrying out, by at least one of the data processors, entity type-specific parsing to extract entity attributes, generate standardized names, and populate data structures that are used to perform said method of within-document entity disambiguation.

11. The method of claim 10, said data structures comprising in-memory token hashes or database records.

12. The method of claim 10, further comprising:
in the ease of person mentions, said entity information extraction process detecting, by at least one of the data processors, any of prefixes and suffixes;
removing, by at least one of the data processors, said detected prefixes and suffixes from a named itself; and
storing, by at least one of the data processors, said detected prefixes and suffixes as attributes.

13. The method of claim 12, further comprising:
using, by at least one of the data processors, a list of given names that includes gender probabilities and confidence levels in conjunction with titles to infer a likely gender of an entity.

14. The method of claim 12, further comprising:
using, by at least one of the data processors, a list of titles as evidence for entity attributes including job category.

15. The method of claim 10, further comprising:
using, by at least one of the data processors, a set of expressions to operate on token type sequences, as opposed to on names themselves, to resolve ambiguities.

16. The method of claim 10, further comprising:
in the case of organizations, computing and storing, by at least one of the data processors, likely acronyms for subsequent use by said disambiguation method.

17. The method of claim 1, wherein a person distance measure enforces gender consistency, deals with given name variants using a given name variant list, and allows initials to match long forms of names;
wherein if a match is found, the name is assigned, by at least one of the data processors, to an existing entity;
wherein if a match is not found, the name is used, by at least one of the data processors, to seed a new entity; and
wherein if a name matches multiple entities, the name is assigned, by at least one of the data processors, to a name having a most recent mention.

18. The method of claim 1, further comprising:
using, by at least one of the data processors, language-specific components as pattern generators.

19. The method of claim 1, further comprising:
creating, by at least one of the data processors, one observed string from another, wherein the two resulting mentions are variants of a same name.

20. The method of claim 1, further comprising:
automatically teaming, by at least one of the data processors, desired transformation properties from a corpus of text;
wherein the need for language-specific resources and rules is obviated.

21. A method for entity disambiguation for implementation by one or more data processors, the method comprising:
using, by at least one of the data processors, cross-document disambiguation to identify an entity across a plurality of context domains, each domain comprising a finite set of context items, the context items comprising standardized names derived in an entity information extraction phase of within-document disambiguation;
using, by at least one of the data processors, a logarithm of an inverse name frequency which comprises a number of standard names with which a context item appears as a weight indicating salience of each context item, wherein co-occurrence with a common name provides less indication that two mentions correspond to a same entity than co-occurrence with an uncommon name;
using, by at least one of the data processors, a sparse count vector for recording all of the items that co-occur with a particular entity;
creating, by at least one of the data processors, a sparse count vector of title tokens that occur with an entity; and
computing, by at least one of the data processors, inverse name frequency weights for said title tokens.

22. The method of claim 21, further comprising:
creating, by at least one of the data processors, a sparse count vector of title tokens that occur with an entity; and
computing, by at least one of the data processors, inverse name frequency weights for said title tokens.

23. The method of claim 21, further comprising:
creating, by at least one of the data processors, a word vector space in an unsupervised fashion;
wherein each document is represented by a vector in said vector space;
deleting, by at least one of the data processors, all named entity mentions from each document prior to computing its vector to avoid double-counting context features;
wherein an unsupervised clustering of some of the document vectors defines a segmentation of the vector space;
uniquely assigning, by at least one of the data processors, each document to a single segment; and computing, by at least one of the data processors, inverse name frequency weights indicating the contexts salience based on a number of standardized names that occur in documents falling into each segment.

24. The method of claim 21, further comprising:
defining, by at least one of the data processors, a separate distance measure per each specific context domain to discount co-occurrence with multiple items, as well as quantify an unexpected lack of shred co-occurrence;
wherein a score produced by each distance measure is loosely interpreted as a function of the likelihood of two randomly generated contexts sharing an observed degree of similarity.

25. The method of claim 24, further comprising:
automatically learning, by at least one of the data processors, the distance measures from unlabeled data by using the fact that pairs of unexpectedly common full names typically correspond to the same entity, whereas pairs with some shared name tokens and some differing name tokens typically correspond to different entities.

26. The method of claim 21, further comprising:
using, by at least one of the data processors, a lexical (string) distance measure to determine whether two name tokens sound the same;
wherein a large negative score indicates a log likelihood.

27. An article comprising a tangible machine-readable storage medium embodying instructions that when performed by one or more machines result in operations comprising:
carrying out a within-document co-reference resolution for a plurality of documents;
aggregating attributes about each entity mentioned in each document; and
using the entity attributes as features in determining which documents concern a same entity;
the within document co-reference resolution comprising:
initializing a list of entities as an empty list;
processing names in order of longest to shortest within each entity type class; and
comparing each name to all entities with which it may be compatible, based on a token hash or database, the comparing being carried out via entity type-specific distance measures.

28. An article comprising a tangible machine-readable storage medium embodying instructions that when performed by one or more machines result in operations comprising:
identifying a first plurality of entities by carrying out a within-document co-reference resolution for a first document;
identifying a second plurality of entities by carrying out a within-document co-reference resolution for a second document;
identifying at least one common entity that exists in the first plurality of entities and the second plurality of entities; and
verifying the at least one common entity by comparing the first plurality of entities to the second plurality of entities;
the within document co-reference resolution comprising:
initializing a list of entities as an empty list;
processing names in order of longest to shortest within each entity type class; and
comparing each name to all entities with which it may be compatible, based on a token hash or database, the comparing being carried out via entity type-specific distance measures.

29. An article comprising a tangible machine-readable storage medium embodying instructions that when performed by one or more machines result in operations comprising:
identifying a first plurality of entities by carrying out a within-document co-reference resolution for a first document;
identifying a second plurality of entities by carrying out a within-document co-reference resolution for a second document;
identifying at least one common entity that exists in the first plurality of entities and the second plurality of entities; and
verifying the at least one common entity based on a first context of the at least one common entity in the first plurality of entities and the second context of the at least one common entity in the second plurality of entities;
the within document co-reference resolution comprising:
initializing a list of entities as an empty list;
processing names in order of longest to shortest within each entity type class; and
comparing each name to all entities with which it may be compatible, based on a token hash or database, the comparing being carried out via entity type-specific distance measures.

30. An article comprising a tangible machine-readable storage medium embodying instructions that when performed by one or more machines result in operations comprising:
using cross-document disambiguation to identify an entity across a plurality of context domains, each domain comprising a finite set of context items, the context items comprising standardized names derived in an entity information extraction phase of within-document disambiguation;
using a logarithm of an inverse name frequency which comprises a number of standard names with which a context item appears as a weight indicating salience of each context item, wherein co-occurrence with a common name provides less indication that two mentions correspond to a same entity than co-occurrence with an uncommon name;
using a sparse count vector for recording all of the items that co-occur with a particular entity;
creating a sparse count vector of title tokens that occur with an entity; and
computing inverse name frequency weights for said title tokens.

31. An article as in claim 30, wherein the tangible machine-readable storage medium further embodies instructions that when performed by one or more machines result in operations comprising:
creating a sparse count vector of title tokens that occur with an entity; and
computing inverse name frequency weights for said title tokens.

32. An article as in claim 30, wherein the tangible machine-readable storage medium further embodies instructions that when performed by one or more machines result in operations comprising:
creating a word vector space in an unsupervised fashion;
wherein each document is represented by a vector in said vector space;
deleting all named entity mentions from each document prior to computing its vector to avoid double-counting context features;

wherein an unsupervised clustering of some of the document vectors defines a segmentation of the vector space; uniquely assigning each document to a single segment; and computing inverse name frequency weights indicating the context's salience based on a number of standardized names that occur in documents falling into each segment.

33. An article as in claim 30, wherein the tangible machine-readable storage medium further embodies instructions that when performed by one or more machines result in operations comprising:
defining a separate distance measure per each specific context domain to discount co-occurrence with multiple items, as well as quantify an unexpected lack of shared co-occurrence;
wherein a score produced by each distance measure is loosely interpreted as a function of the likelihood of two randomly generated contexts sharing an observed degree of similarity.

34. An article as in claim 33, wherein the tangible machine-readable storage medium further embodies instructions that when performed by one or more machines result in operations comprising:
automatically learning the distance measures from unlabeled data by using the fact that pairs of unexpectedly common fall names typically correspond to the same entity, whereas pairs with some shared name tokens and some differing name tokens typically correspond to different entities.

35. An article as in claim 30, wherein the tangible machine-readable storage medium further embodies instructions that when performed by one or more machines result in operations comprising:
using a lexical (string) distance measure to determine whether two name tokens sound the same;
wherein a large negative score indicates a log likelihood.

* * * * *